United States Patent [19]
Nishikawa et al.

[11] Patent Number: 4,565,267

[45] Date of Patent: Jan. 21, 1986

[54] DIRECT-COUPLING CLUTCH CONTROL DEVICE FOR A TORQUE CONVERTER IN VEHICULAR AUTOMATIC TRANSMISSION

[75] Inventors: Masao Nishikawa, Tokyo; Yoshimi Sakurai, Tanashi, both of Japan

[73] Assignee: Honda Giken Kogyo Kabushiki Kaisha, Tokyo, Japan

[21] Appl. No.: 596,472

[22] Filed: Apr. 3, 1984

[30] Foreign Application Priority Data

Apr. 6, 1983 [JP] Japan ................................. 58-60363

[51] Int. Cl.⁴ ....................... B60K 41/28; F16H 41/18
[52] U.S. Cl. ................... 192/3.31; 192/0.052; 192/0.092
[58] Field of Search .................. 192/0.076, 3.31, 3.58, 192/3.57, 0.032, 103 R, 0.092, 0.052; 74/866, 731, 732, 733

[56] References Cited

U.S. PATENT DOCUMENTS

| | | | |
|---|---|---|---|
| 4,422,353 | 12/1983 | Suga et al. | 192/3.31 X |
| 4,457,410 | 7/1984 | Suga et al. | 192/0.052 |
| 4,507,985 | 4/1985 | Morimoto et al. | 192/3.31 X |
| 4,512,212 | 4/1985 | Ishikawa | 74/733 |
| 4,516,671 | 5/1985 | Nishikawa | 192/3.31 |

*Primary Examiner*—George H. Krizmanich
*Attorney, Agent, or Firm*—Armstrong, Nikaido, Marmelstein & Kubovcik

[57] ABSTRACT

A direct coupling control device controlling a direct coupling clutch to be actuated at a lower vehicle speed when the automatic transmission shifter is in automatic position and at a higher speed when the shifter is in the normal position.

The engagement force of the clutch can be increased with vehicle speed. A lock-releasing mechanism can be provided to release engagement of the clutch momentarily during shifting of the transmission.

4 Claims, 7 Drawing Figures

DIRECT-COUPLING CLUTCH CONTROL DEVICE FOR A TORQUE CONVERTER IN VEHICULAR AUTOMATIC TRANSMISSION

BACKGROUND OF THE INVENTION

This invention relates to a direct-coupling control device for a torque converter in a vehicular automatic transmission, and more particularly, in the case where the transmission includes a shift position permitting a transmission gear ratio of medium or high speed stage to be held, the invention relates to a configuration adapted to control the direct-coupling or locked-up state of the torque converter in such shift position.

In a vehicular automatic transmission equipped with a fluid-type torque converter, the torque converter is usually direct-coupled or locked-up to eliminate fluid slippage loss of the torque converter. Such lock-up can cause the torque converter to lose one of its functions, i.e., a torque amplifying function. Therefore, the power efficiency of the torque converter is liable to deteriorate. In a shift position where a gear shift can be effected automatically, no problem will be caused because the gear is shifted to a lower speed stage in accordance with the amount of movement of the accelerator pedal. Meanwhile, in a shift position where a gear shift is not effected automatically, a problem of deterioration in the power efficiency will be caused. It is also known to release the lock-up in accordance with the certain amount of movement of an accelerator pedal even in the latter shift position where a gear shift is not effected. This is an effective means. However, if such a means is applied to all of the vehicle speeds, the fuel consumption is increased in a range greater than the above predetermined amount of movement of the accelerator pedal. Thus, it is required that the amount of movement is controlled to be variable in response to the vehicle speed instead to being held constant. But, to realize that control, a control device would be complicated in its configuration. The necessary installation space is enlarged.

The final object of lock-up technique is to realize the full-time lock-up (i.e., to permit the lock-up at all times during driving of the vehicle), so that, in a shift position where a gear shift is made automatically, the lock-up is preferably effected all over the range even in transmission gear ratios of medium and high speed stages. In a shift position where the transmission gear ratios of medium and high speed stages are held, however, the full-range lock-up is practically unfeasible because it will result in stalling of an engine i.e., engine failure. In practice, therefore, there must be provided a valve means for releasing the locked-up state at a vehicle speed below a certain value and a means for detecting the vehicle speed. It is required to accurately release the lock-up at a vehicle speed below the set value. Moreover, although a vehicle speed detecting means of oil hydraulic type can be used with the set vehicle speed being sufficiently high, but, in an attempt at lowering the set vehicle speed based on the foregoing full-time lock-up principle, the conventional vehicle speed detecting means of oil hydraulic type utilizing a centrifugal force is limited in its accuracy. This requires the use of an electrical vehicle speed detecting means and a solenoid valve operated in response to a signal from the means. Such an electronic control system is generally expensive. The use of the expensive electronic control system is not necessitated to prevent an engine failure in a drive position because the transmission gear ratio is shifted down automatically in that position. As a result, electronic control will be effected only in a shift position where the transmission gear ratio of medium or high speed stage is held, thereby resulting in an unbalance between the cost and the efficiency.

OBJECTS AND SUMMARY OF THE INVENTION

The present invention has been accomplished in view of the two problems as mentioned above. It is a primary object of the invention to provide a simple and reliable direct-coupling control device for a torque converter wherein a vehicle speed for actuating lock-up is set on the higher speed side in a shift position used less frequently, and the vehicle speed for actuating lock-up is set on the lower side to offer a mode near the full-range lock-up in an automatic transmission gear range which is frequently used and where the speed is automatically shifted down. This ensures reduction in practical fuel consumption as well as an increase in power efficiency in a shift position where the transmission gear ratio is held, using an all-hydraulic control system in place of an expensive electronic control system.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
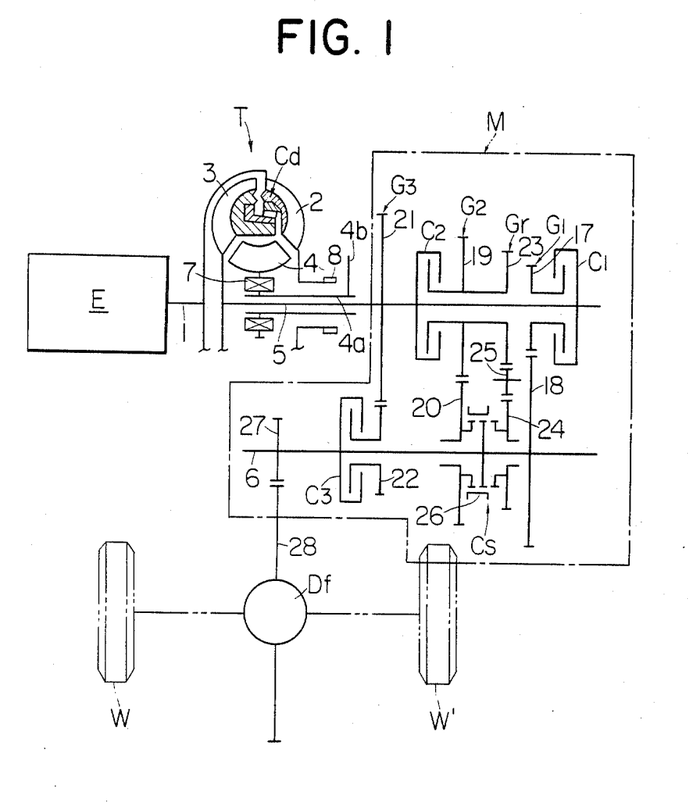
FIG. 1 is a general schematic view of a vehicular automatic transmission with forward three speeds and a reverse.

In the following, a first preferred embodiment of the present invention will be described with reference to the accompanying drawings. Referring to FIG. 1 there is schematically shown an automatic transmission for automobiles with forward three speeds and one reverse to which the present invention is applied. The output of an engine E is transmitted from its crank shaft 1 to driving wheels W, W' through a torque converter T, an auxiliary transmission M and a differential gear Df in that order to drive the wheels W, W'.

The torque converter T is composed of: a pump vane wheel 2 coupled to the crank shaft 1; a turbine vane wheel 3 coupled to an input shaft 5 of the auxiliary transmission M; and a stator vane wheel 4 coupled to a stator shaft 4a through a one way clutch 7, the stator shaft 4a being rotatably supported over the input shaft 5 relative to each other. The torque transmitted from the crank shaft 1 to the pump vane wheel 2 is fluid-dynamically transmitted to the turbine vane wheel 3, so that the torque is amplified and the stator vane wheel 4 bears the attendant reaction force, as is well known in the art.

Figure 2:
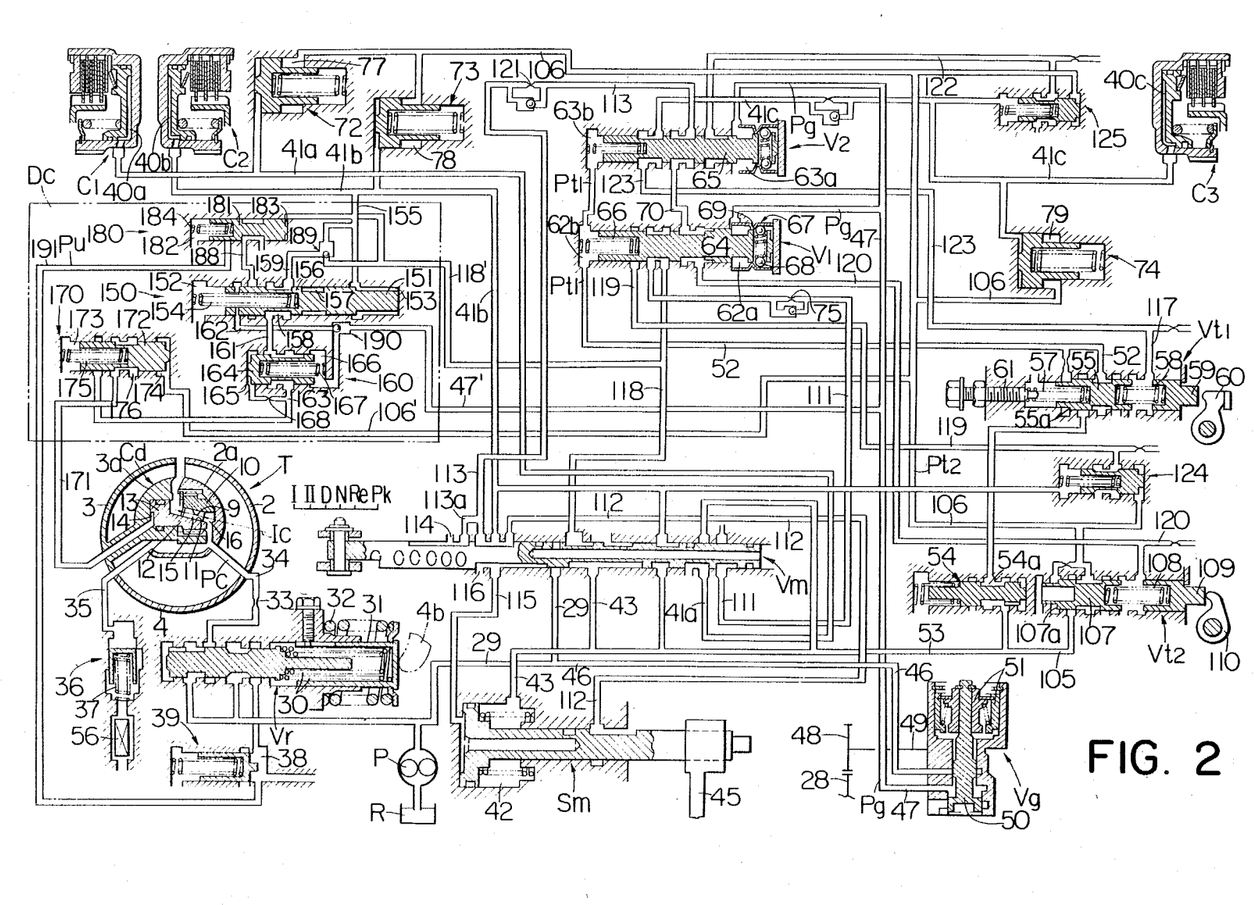
FIG. 2 is a hydraulic control circuit diagram for the automatic transmission of FIG. 1 including a direct-coupling control device of a first embodiment of the present invention.

The right end of the pump vane wheel 2 is provided with a pump driving gear 8 driving hydraulic pump P shown in FIG. 2. A stator arm 4b is attached to the right end of the stator shaft 4a to control a regulator valve Vr shown in FIG. 2.

A roller type direct coupling clutch Cd is interposed between the pump vane wheel 2 and the turbine vane wheel 3 so as to mechanically link them to each other. This can be seen in detail with reference to FIGS. 2 and 3. An annular driving conical surface 9 is splined to an inner circumferential wall 2a of the pump vane wheel 2. A driven member 12 which has a driven conical surface 11 about its outer periphery facing and parallel to the driving conical surface 9 is spline-fitted to an inner peripheral wall 3a of the turbine vane wheel 3 in an axially slidable fashion. A piston 13 is integrally formed at one end of the driven member 12 so as to slidably fit into a hydraulic cylinder 14 provided at the inner circumferential wall 3a of the turbine vane wheel 3. The piston effectively simultaneously receives an internal pressure of hydraulic fluid in the cylinder 14 at its left end face and an internal pressure of the hydraulic fluid in the torque converter T at its right end face, respectively.

Figure 3:
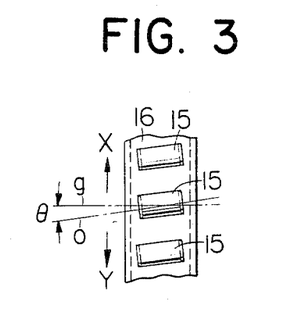
FIG. 3 is a developed view showing an essential part of a direct-coupling clutch in FIG. 2.

A plurality of cylindrical clutch rollers 15 are interposed between the driving and driven conical surfaces 9, 11 and, as shown in FIG. 3, are held by an annular retainer 16 such that the central axes o of the clutch rollers 15 are inclined by a predetermined angle $\theta$ with respect to the generatrix g of the imaginary conical surface Ic (FIG. 2) passing through the center between both conical surfaces 9 and 11.

As a result, when oil pressure higher than the internal pressure of the torque converter T is introduced into the hydraulic cylinder 14 at a stage at which the torque amplifying function of the torque converter is unnecessary, the piston 13 and hence the driven member 12 is pushed toward the driving member 10. This causes the clutch rollers 15 to be brought into pressure-contact with both conical surfaces 9 and 11. At this time, if the driving member 10 is rotated with the output torque of the engine E relative to the driven member 12 in the X direction as indicated in FIG. 3, the clutch rollers 15 rotate about their own axes. Since the center axes o of the clutch rollers 15 are inclined as previously noted, such rotation of the clutch rollers about their own axes imparts relative axial displacements, causing them to approach to each other. Consequently, the clutch rollers 15 bite into between both conical surfaces 9 and 11, so that they mechanically link members 10 and 12, i.e., the pump vane wheel 2 and the turbine vane wheel 3. Even under such actuation of the direct-coupling clutch Cd, if an output torque of the engine which exceeds the linking force of the clutch is applied to the vane wheels 2 and 3, the clutch rollers 15 slip relative to the respective conical surfaces 9 and 11, thereby dividing the engine output torque into two parts. One part of the torque is mechanically transmitted through the direct-coupling clutch Cd, while the remaining torque is fluid-dynamically transmitted through the vane wheels 2 and 3 to the input shaft 5, thus forming a variable rate power dividing system varying the ratio of the former torque to the latter torque in accordance with the slippage of the clutch rollers 15.

In the actuated state of the direct-coupling clutch Cd, if a reverse load is applied to the torque converter T, the rotational speed of the driven member 12 is larger than that of the driving member 10. Thus, the driving member 10 is rotated in the Y direction with respect to the driven member 12 and the clutch rollers 15 are accordingly rotated about their own axes in the direction opposite to that of the above case, to impart relative axial displacements to both members 10 and 12 to move them apart from each other. As a result, the clutch rollers 15 are released from their engagement with both conical surfaces 9 and 11 and are left idling. Consequently, transmission of the reverse load from the turbine vane wheel 3 to the pump vane wheel 2 is carried out only in a fluid-dynamic fashion.

With the hydraulic cylinder 14 free of the oil pressure, the piston 13 moves by reaction of the internal pressure of the torque converter T and retreats to its original position, so that the direct-coupling clutch Cd is brought into the non-actuated state.

Referring again to FIG. 1, between the parallel input and output shafts 5, 6 of the auxiliary transmission M, a low speed stage gear train G1, a medium speed stage gear train G2, a high speed stage gear train G3 and a reverse gear train Gr are provided in parallel to one another. The low speed stage gear train G1 comprises a driving gear 17 coupled to the input shaft 5 through a low speed stage clutch C1 serving as a frictional engaging element for starting, and a driven gear 18 secured onto the output shaft 6 meshing with the driving gear 17. The medium speed stage gear train G2 comprises a driving gear 19 coupled to the input shaft 5 through a medium speed stage clutch C2, and a driven gear 20 coupled to the output shaft 6 through a changeover clutch Cs for meshing with the driving gear 19. The high speed stage gear train G3 comprises a driving gear 21 secured onto the input shaft 5, and a driven gear 22 coupled to the output shaft 6 through a high speed stage clutch C3. And the reverse gear train Gr comprises a driving gear 23 integrally formed with the driving gear 19 of the medium speed stage gear train G2, a driven gear 24 coupled to the output shaft 6 through the changeover clutch Cs, and an idle gear 25 in mesh with both gears 23 and 24. The changeover clutch Cs is disposed between the driven gears 20 and 24 and permits the driven gears 20, 24 to be selectively coupled to the output shaft 6 when a selector sleeve 26 of the clutch Cs is shifted to a left-hand forward speed position or a right-hand reverse speed position in the figure, respectively.

Thus, when the selector sleeve 26 is held at the forward speed position as shown in the figure, if the low speed stage clutch C1 is connected alone, the driving gear 17 is coupled to the input shaft 5 to establish the low speed stage gear train G1, so that the torque is transmitted from the input shaft 5 to the output shaft 6 through the gear train G1. Next, if the medium speed stage clutch C2 is connected while the low speed stage clutch C1 is disconnected, the driving gear 19 is now coupled to the input shaft 5 to establish the medium speed stage gear train G2, so that the torque is transmitted from the input shaft 5 to the output shaft 6 through the gear train G2. If the high speed stage clutch C3 is connected while both low and medium speed stage clutches C1, C2 are disconnected, the driven gear 22 is now coupled to the output shaft 6 to establish the high speed stage gear train G3, so that the torque is transmitted from the input shaft 5 to the output shaft 6 through the gear train G3. Subsequently, if the selector sleeve 26 is shifted to the right-hand reverse speed position and the medium speed stage clutch C2 alone is connected, the driving gear 23 and the driven gear 24 are respectively coupled to the input shaft 5 and the output shaft 6 to establish the reverse gear train Gr, so that the torque is transmitted from the input shaft 5 to the output shaft 6 through the gear train Gr.

The torque transmitted to the output shaft 6, in turn, is transmitted to a larger diameter gear 28 of the differential gear Df from an output gear 27 provided at the end of the output shaft 6.

Referring to FIG. 2, the hydraulic pump P pumps oil from an oil reserver R and feeds it to a hydraulic oil passage 29 under pressure. The pressurized oil is first regulated to a predetermined pressure through a regulator valve Vr. The oil is fed to a manual valve Vm as a gear shift control means. This oil pressure will be referred to as a line pressure Pl hereinafter.

The regulator valve Vr includes a pressure governing spring 30 and a spring receiving tube 31 for supporting the outer end of the spring 30. The spring receiving tube 31 is movable leftward or rightward to adjust the set load of the pressure governing spring 30. The stator arm 4b of the torque convertor abuts against the outer surface of the spring receiving tube 31 to apply a reaction force acting on the stator vane wheel 4, i.e., stator reaction force, thereto. A stator spring 32 for supporting the stator reaction force is connected to the spring receiving tube 31. Therefore, since the stator spring 32 is further compressed with increasing stator reaction force, the spring receiving tube 31 is moved leftward accordingly to increase the set load of the pressure governing spring 30. As a result, the line pressure Pl in the hydraulic oil passage 29 is also increased.

A path of the pressurized oil after being governed in pressure through the regulator valve Vr is introduced into the torque converter T through an inlet oil passage 34 having a throttling orifice 33 therein, so that the inside of the torque converter T is pressurized to prevent cavitation. This internal pressure can be determined by the size of the throttling orifice 33, the strength of spring 37 in check valve 36 provided in an outlet oil passage 35 of the torque converter T, and other parameters.

The oil having passed through the check valve 36 is returned to the oil reserver R through an oil cooler 56.

The surplus pressurized oil discharged from the hydraulic pump P is introduced into a lubricating oil passage 38 through the regulator valve Vr for feeding to the respective lubricated sections. In order to ensure the essential minimum oil pressure for this, a pressure governing valve 39 is connected in the lubricating oil passage 38.

The pressurized oil fed to the manual valve Vm will not be sent to any of the aforesaid clutches C1, C2 and C3 nor to other various hydraulically actuated parts, when the valve Vm is in the illustrated neutral position (N). Thus, all of the three clutches C1, C2 and C3 are disengaged, so that the torque of the engine E will not be transmitted to the wheels W, W'.

When the manual valve Vm is moved leftward from the illustrated position by one stage and hence shifted to a drive position D, the hydraulic oil passage 29 from the hydraulic pump P now communicates with oil passages 43 and 118, and an oil passage 111 including a uni-directional throttling device 75 communicates with a hydraulic oil passage 41a and a hydraulic cylinder 40a of the low speed stage clutch C1. Meanwhile, an oil passage 112 is disconnected from a hydraulic oil passage 41b in communication with a hydraulic cylinder 40b of the medium speed stage clutch C2, and an oil passage 113a is disconnected from an exhaust port 114. An oil passage 115 still remains communicated with an exhaust port 116. The hydraulic oil passage 43 is communicated with a spring chamber 42 of a hydraulic servo motor Sm for shifting the selector sleeve 26, whereby piston 44 of the servo motor Sm remains at the illustrated leftward position to hold the selector sleeve 26 by shift fork 45 in the forward speed position as indicated in FIG. 1. Consequently, the reverse gear train Gr is held inoperative.

An input oil passage 46 in communication with an input port of a governor valve Vg branches from the hydraulic oil passage 29, and a first signal oil pressure passage 47 extends from an output port of the valve Vg.

The governor valve Vg is a well known type and rotates about its own rotation axis 49 by a gear 48 in mesh with the larger diameter gear 28 of the differential gear Df. Thus, since a rotational speed of the governor valve Vg is proportional to the vehicle speed, the governor valve Vg can output oil pressure in proportion to the vehicle speed, i.e., governor pressure Pg, to the first signal oil pressure passage 47 under the action of a centrifugal force exerting on a weight 51 of a spool valve body 50.

An oil passage 53 branches from the hydraulic oil passage 43 and is connected to a first throttle valve Vt1 through a modulator valve 54. The modulator valve 54 is a pressure reducing valve so arranged that it is biased toward the closed side by a spring force and also by a modulator pressure at an output port 54a, thereby restricting the upper limit value of an inlet pressure of the first throttle valve Vt1.

The first throttle valve Vt1 is a well known type and includes a spool valve body 55, a control spring 58 adapted to push the valve body 55 leftward, a return spring 57 adapted to push the valve body 55 rightward, a control piston 59 for supporting the outer end of the control spring 58, a control cam 60 rotated in conjunction with an increase in the degree of opening of a throttle valve in the engine E for moving the control piston 59 leftward, an adjusting bolt 61 adapted to adjust the set load of the return spring 57, etc. When the control piston 59 is moved leftward, the displacement is transmitted to the spool body 55 via the control spring 58 to push the former leftward. Upon this leftward movement of the spool body 55, the oil pressure output to a second signal oil pressure passage 52 is exerted on a left-hand shoulder 55a of the spool valve body 55 to push back the body 55 rightward, so that the first throttle valve Vt1 outputs an oil pressure Pt1. It is to be noted that counterclockwise rotation of the control cam 60 serves to continuously throttle the communicated degree between an oil passage 117 and the oil reservoir R.

The first and second signal oil pressure passages 47 and 52 are connected to pilot hydraulic chambers 62a, 63a and 62b, 63b at both ends of a low/medium speed shifting valve V1 and a medium/high speed shifting valve V2, respectively. With this, spool valve bodies 64, 65 of these shifting valves V1, V2 are operated as follows by receiving the governor pressure Pg and the first throttle pressure Pt1 at their right and left faces.

More specifically, the spool valve body 64 of the low/medium speed shifting valve V1 initially remains at the illustrated rightward position by the resilient force of a spring 66, so that an oil passage 118 communicates with the hydraulic oil passage 41a through the oil passage 111 and hence the low speed stage clutch C1 is pressurized to be engaged. Then, when the governor pressure Pg increases with a rise in the vehicle speed and the force caused by governor pressure Pg for moving the spool valve body 64 leftward overcomes the force caused by the spring 66 for moving the valve body 64 rightward, click balls 68 arranged in a click motion or snap action mechanism 67 at the right end of the valve body 64 to be movable together with the valve body 64 now ride over a fixed positioning boss or annular land 69, so that the valve body 64 is rapidly switched to the leftward position. The oil passage 111 then communicates with a drain passage 119 and the oil passage 118 communicates with the oil passage 70. Meanwhile, the oil passage 70 is disconnected from drain passage 120. In this state, if the medium/high speed stage shifting valve V2 is in the illustrated position, the oil passage 70 communicates with an oil passage 113 including a uni-directional throttling device 121 therein and further with the hydraulic oil passage 41b through the manual valve Vm. Accordingly, the hydraulic oil is supplied to the hydraulic cylinder 40b to pressurize the medium speed stage clutch C2 into the engaged state. As a result, the medium speed stage gear train G2 is established.

As the vehicle speed further increases, the medium/-high speed shifting valve V2 is also subject to the similar action to that as mentioned above. In other words, the spool valve body 65 of the valve V2 is moved leftward due to the increased governor pressure Pg, whereupon the oil passage 113 communicates with a drain passage 122, the oil passage 70 communicates with a hydraulic oil passage 41c leading to a hydraulic cylinder 40c of the high speed stage clutch C3, and the hydraulic oil passage 41c is disconnected from a drain oil passage 123. As a result, the medium speed stage clutch C2 is released from its engaged state, and the high speed stage clutch C3 is instead pressurized for engagement so as to establish the high speed stage gear train G3.

To moderate the shock at the time of shifting speeds, accumulators 72, 73 and 74 are hydraulically connected to the clutches C1, C2 and C3 in parallel, respectively. Moreover, first-second speed orifice control valve 124 is disposed in the drain oil passage 119, while a second-third speed orifice control valve 125 is disposed in the drain oil passage 122.

A second throttle pressure Pt2 from a second throttle valve Vt2 is introduced to respective back pressure chambers 77, 78 and 79 of the accumulators 72, 73 and 74 through an oil passage 106. The second throttle valve Vt2 is interposed between an oil passage 105 branched from the oil passage 53 and the oil passage 106, and includes a spool valve body 107, a control spring 108 adapted to push the valve body 107 leftward, a control piston 109 for supporting the outer end of the control spring 108, and a control cam 110 rotated in conjunction with an increase in the degree of throttle opening of the engine E for moving the control piston 109. With the control piston 109 being moved leftward, this displacement is transmitted to the spool valve body 107 through the control spring 108, thereby to move the spool valve body 107 leftward. Upon such leftward movement of the spool valve body 107, the oil pressure output to the oil passage 106 is exerted on a left-hand shoulder 107a of the spool valve body 107 to push back the same rightward. In this way, the second throttle valve Vt2 functions to moderate the aforesaid speed shifting shock by outputting the second throttle pressure Pt2 to the oil passage 106, the pressure Pt2 being in proportion to the throttle opening degree of the engine E.

Figure 4:
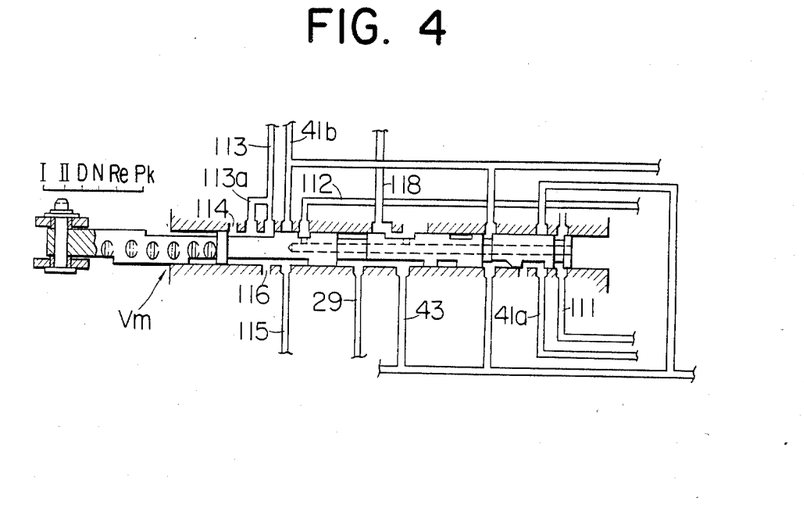
FIG. 4 is a view showing the connected state of the associated oil passages with a manual valve being in a medium speed stage holding position.

In case the manual valve Vm is shifted to another shift position other than the drive position D, e.g., a medium speed stage holding position II, as indicated in FIG. 4, the hydraulic oil passage 29 for introducing the hydraulic oil from the hydraulic pump P now communicates with the hydraulic oil passage 41b, so that only the medium speed stage clutch C2 is engaged to establish the medium speed stage gear train G2 or the reverse gear train Gr. In case the manual valve Vm is shifted to a low speed stage holding position I, only the low speed stage clutch C1 is engaged to establish the low speed stage gear train G1. Moreover, when shifted to a reverse speed position Re, the piston of the servo motor Sm is moved rightward to establish the reverse gear train Gr. It is to be noted that a shift position Pk in the manual valve Vm designates a parking position.

The configuration of a control means Dc for controlling operation of the direct-coupling clutch Cd will be described hereinafter with reference to FIG. 2. The control means Dc includes therein four valves 150, 160, 170 and 180.

The valve 150 is a lock-up releasing valve having two functions; the first function is to release the lock-up state temporarily at the time of gear shifting thereby to absorb the gear shifting shock by the torque converter T, and the second function is to enlarge an extent of the lock-up map for the transmission gear ratio of medium speed stage in the drive position D. The valve 150 comprises a spool valve body 151 movable between a first changeover position on the right-hand side and a second changeover position on the left-hand side, a first pilot hydraulic chamber 152 facing the left end face of the valve body 151, a second pilot hydraulic chamber 153 facing the right end face of the valve body 151, and a spring 154 adapted to push the valve body 151 rightward. An oil passage 155 branched from the hydraulic oil passage 41b of the medium speed stage clutch C2 is connected to the second pilot hydraulic chamber 153, while the first pilot hydraulic chamber 152 is connected with the oil reservoir R. On the outer periphery of the valve body 151 there are symmetrically formed two annular grooves 157 and 158 on the right and left side of a land 156, respectively. When the valve body 151 is in the first changeover position as indicated, an input oil passage 159 is communicated with an output oil passage 161 leading to the valve 160. This state remains unchanged also when the valve body 151 is in the second changeover position on the left-hand side. At the intermediate position of a stroke in which the valve body 151 moves from the first changeover position to the second changeover position, however, the output oil passage 161 is temporarily disconnected from the input oil passage 159 and communicated with an oil passage 188 from the valve 180 only.

For example, when the valve body 151 is moved from the illustrated first changeover position to the second changeover position, the input oil passage 159 is first closed by the land 156, the oil passage 188 is then communicated with the output oil passage 161, the output oil passage 161 is then closed by the land 156, and finally the output oil passage 161 is again communicated with the input oil passage 159 after the passing of the land 156. When the valve body 151 is moved from the second changeover position to the first changeover position, the respective oil passages are duly communicated with each other in the order opposite to the other process.

Moreover, when the valve body 151 is in the illustrated first changeover position, an oil passage 162 is communicated with the oil reservoir R through the first pilot hydraulic chamber 152. During engagement of the medium speed stage clutch C2, however, the valve body 151 is moved leftward so that the oil passage 162 is now communicated with the oil passage 188 and disconnected from the oil resevoir R. Further, the input oil passage 159 includes therein a first high-selection valve 189 adapted to select and introduce the larger pressure of the supply pressure to the medium speed stage clutch C2 or the oil pressure in an oil passage 118' branched from the oil passage 118, when in the drive position D.

The valve 160 is disposed between the output oil passage 161 and an oil passage 163, and comprises a spool valve body 164 movable between a rightward closed position and a leftward opened position, a first pilot hydraulic chamber 165 facing the left end face of the valve body, a second pilot hydraulic chamber 166 facing the right end face of the valve body 164, and a spring 167 adapted to normally bias the valve body 164 toward the opened side. To the second pilot hydraulic chamber 166 there are connected an oil passage 162 and an oil passage 47' branched from the first signal oil passage 47 for introducing the governor pressure Pg, through a second high-selection valve 190. Therefore, the larger pressure of the oil pressure in the oil passage 162 or the governor pressure Pg is introduced into the second pilot hydraulic chamber 166. The first pilot hydraulic chamber 165 is connected to the oil passage 163 through a throttling orifice 168, so that the oil passage 163 receives oil pressure which follows the pressure inside the second pilot hydraulic chamber 166 but is higher than that by an amount corresponding to a resilient force of the spring 167.

The valve 170 is disposed between the oil passage 163 and an oil passage 171 communicating with the hydraulic cylinder 14 of the direct-coupling clutch Cd, and includes a spool valve body 172 movable between a rightward closed position and a leftward opened position, a first pilot hydraulic chamber 173 facing the left end face of the valve body 172, a second pilot hydraulic chamber 174 facing the right end face of the valve body 172, and a spring 175 adapted to normally bias the valve body 172 toward the closed side. The first pilot hydraulic chamber 173 is communicated with the oil reservoir R, while the second pilot hydraulic chamber 174 is communicated with an oil passage 106' branched from the oil passage 106 for introducing the second throttle pressure Pt2. In the valve 170 thus arranged, when the second throttle pressure Pt2 is less than a resilient force of the spring 175, the valve body 172 comes into the closed position as shown, whereupon the oil pressure in the hydraulic cylinder 14 of the direct-coupling clutch Cd is liberated through the oil passage 171 and a release port 176. Meanwhile, when the second throttle pressure Pt2 overcomes the resilient force of the spring 175, the valve 170 is now opened, so that the oil pressure from the valve 160 is supplied to the hydraulic cylinder 14 through the oil passage 163, the valve 170 and then the oil passage 171.

The valve 180 is disposed between an oil passage 191 for introducing the lubricating oil pressure Pu regulated by the pressure governing valve 39 and the oil passage 188, and includes a spool valve body 181 movable between a rightward closed position and a leftward opened position, a first pilot hydraulic chamber 182 facing the left end face of the valve body 181, a second pilot hydraulic chamber 183 facing the right end face of the valve body 181, and a spring 184 adapted to normally bias the valve body 181 toward the closed side. The first pilot hydraulic chamber 182 is communicated with the oil reservoir R, while the second pilot hydraulic chamber 183 is communicated with the oil passage 118'. Thus, when an oil pressure in the oil passage 118' is less than a resilient force of the spring 184, the valve 180 is closed (as shown) so that the oil passage 188 is opened to the oil reservoir R. Meanwhile, when the oil pressure in the oil passage 118' overcomes the resilient force of the spring 184, the valve body 181 is moved leftward to open the valve 180, so that the oil passage 191 for introducing the lubricating oil pressure Pu now communicates with the oil passage 188.

Hereinafter, the operation of the foregoing embodiment will be described. When the vehicle is driven with the manual valve Vm being in the drive position D, the line pressure Pl is always introduced to the oil passages 118, 118'. Although oil pressure is introduced also to the hydraulic oil passage 41b when the transmission gear ratio of medium speed stage is established, oil pressures in the two oil passages 118 and 41b are equal to each other in principle in such case, so that the input oil passage 159 of the valve 150 is always subjected to the line pressure Pl. Thus, the line pressure Pl is also introduced to the output passage 162 and then controlled to a pressure higher than the governor pressure Pg by a predetermined value under the action of the spring 167 in the valve 160. The pressure thus controlled is applied to the valve 170. With the throttle being in the idle position, the valve 170 is closed so that the oil pressure from the valve 160 will not be transmitted to the hydraulic cylinder 14 of the direct-coupling clutch Cd. In the case other than the above, the pressurized oil is supplied to the hydraulic cylinder 14 through the oil passage 171. And when this supplied oil pressure exceeds the internal pressure of the torque converter T, the direct-coupling clutch Cd is actuated to lock up the torque converter T. The oil pressure in the oil passage 171 at this time is represented by two parabolas as indicated by a solid line in FIG. 5, and the torque converter T is locked up at a vehicle speed higher than Vo. It is to be noted that a two-dot chain line in FIG. 5 designates a characteristic of the governor pressure, while a one-dot chain line therein designates the internal pressure of the torque converter T.

Figure 5:
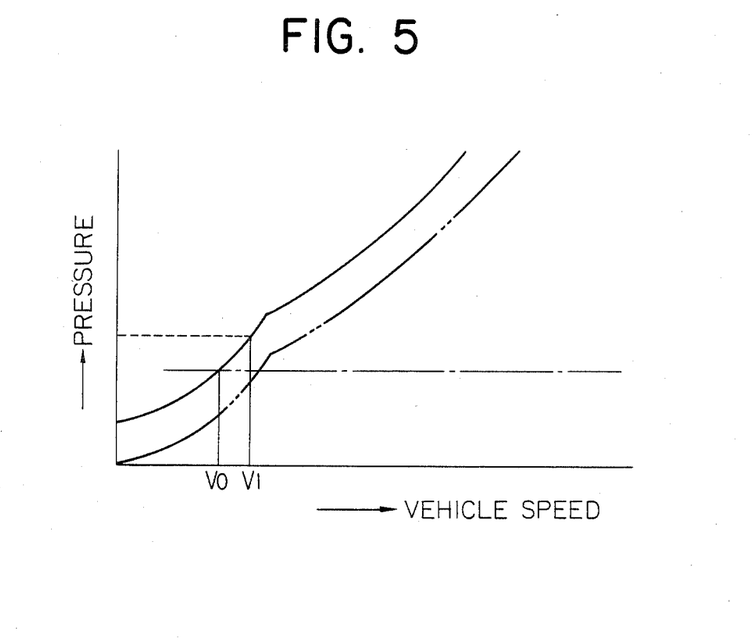
FIG. 5 is a graph showing engagement force of the direct-coupling clutch related to vehicle speed.

When the transmission gear ratio of medium speed stage is established in the drive position D, the valve body 151 of the valve 150 is moved leftward causing the oil passage 188 to be communicated with the oil passage 162 and the valve body 181 of the valve 180 is also moved leftward causing the oil passage 191 to be communicated with the oil passage 188, so that the second high-selection valve 190 is subjected to the governor pressure Pg and the lubricating oil pressure Pu. And at a vehicle speed lower than V1 where both oil pressures Pg and Pu equal each other, the lubricating oil pressure Pu is introduced to the second pilot hydraulic chamber 166 of the valve 160. In other words, when the transmission gear ratio of medium speed stage is established in the drive position D, the oil pressure indicated by a broken line in FIG. 5 is present in the oil passage 171 at a vehicle speed lower than V1. The engine E will not be stalled even in such condition, because the transmission gear ratio is automatically shifted down to the low speed stage as the vehicle speed is lowered, and because the lock-up engagement pressure returns to the position as indicated by a solid line in FIG. 5 and becomes less than the internal pressure of the torque converter T.

Figure 6:
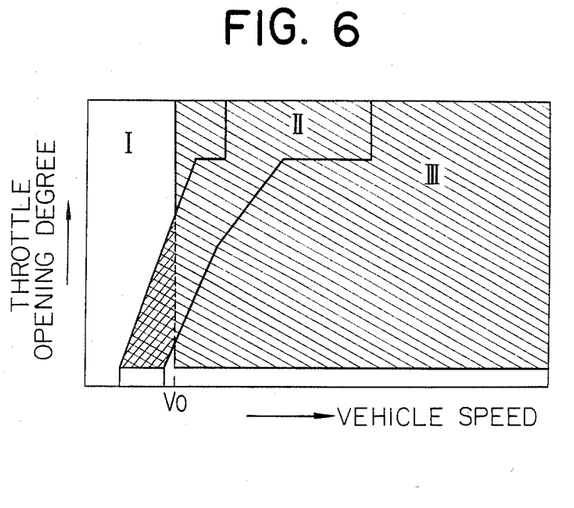
FIG. 6 is a view showing the lock-up map in a drive position.

One example of the lock-up map thus controlled is shown in FIG. 6. Referring to FIG. 6, regions I, II and III enclosed by solid lines represent low speed, medium speed and high speed stage regions, respectively.

The section filled with lines inclined downwardly to right designates a lock-up region. As will be seen from the figure, the lock-up is released at a vehicle speed lower than Vo in the low and high speed stages, while the lock-up is effected even at such a vehicle speed in the medium speed stage. The transmission gear ratio is automatically shifted down with the accelerator pedal being stepped upon, so that the power efficiency will not be deteriorated.

Meanwhile, if the manual valve Vm is shifted to the medium speed stage holding position II, the oil pressure in the oil passage 118 is released to zero as shown in FIG. 4 and hence the engagement pressure of the medium speed stage clutch C2 is introduced to the input oil passage 159 through the first high-selection valve 189. At the same time, the valve body 181 of the valve 180 is moved rightward and the lubricating oil pressure Pu has now no relation with the lock-up. As a result, the lock-up range in the medium speed stage holding position II is limited to that higher than the vehicle speed Vo and the lock-up is released in the section filled with lines inclined downward to left.

During the time the vehicle is travelling at the medium speed stage holding position II, kick-down can not be effected by the accelerator pedal. So it is preferable that the lock-up vehicle speed be shifted to the higher speed side where the torque converter T will lose (or reduce) its torque amplifying function. This can be achieved just by providing the valve 180, according to the present invention. It is to be noted that the torque converter T is not locked-up in the low speed stage holding position I, because oil pressures in the oil passges 118 and 41b are both zero.

Figure 7:
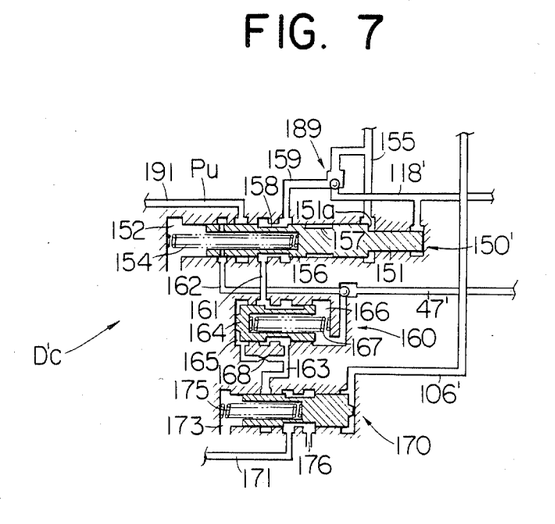
FIG. 7 is a hydraulic circuit diagram showing the configuration of a control means according to the second embodiment of the present invention.

FIG. 7 shows another control means Dc' in accordance with the second embodiment of the invention wherein the valve 180 is dispensed with. In addition, the valve 150 in the foregoing embodiment is replaced by a valve 150' as a lock-up releasing valve which is constructed with the valve body 151 having a shoulder 151a formed at its right end part. The oil pressure from the oil passage 155 is exerted on the shoulder 151a, and the oil pressure in the oil passage 118' acts upon the right end face of the valve body 151. The area of the shoulder 151a and parameters of the spring 154 are selected such that the valve body 151 will not be moved leftward against a resilient force of the spring 154 by the pressure in the oil passage 155 or 118' alone.

With the manual valve Vm being in the drive position D, since the oil pressure in the hydraulic oil passage 41b leading to the medium speed stage clutch C2 is zero in both low and high speed stages and hence the valve body 151 is subjected to the oil pressure in the oil passage 118' alone, the valve body 151 remains at the rightward position as indicated. However, at the time of, for example, low-speed starting in the drive position D or starting the medium speed stage holding position II, the line pressure Pl is increased by operation of the stator arm 4b, so that the pressure exerted on the right end face of the valve body 151 is increased to move the valve body 151 leftward. In such a case, although the lock-up pressure is raised up under the action of the lubricating oil pressure Pu in the oil passage 191, the internal pressure of the torque converter T is also raised up through the throttling orifice 33. Consequently, there will not be caused the lock-up action and hence an engine failure will never result.

According to this embodiment, since the function of the valve 180 in the foregoing embodiment is borne by the valve 150', the valve 180 can be dispensed with and the entire construction is further simplified.

Various changes and applications can be made in practical use of the present invention. In an automatic speed gear with four speeds, for example, the lubricating oil pressure Pu may be easily acted for the second and fourth speeds. Although, in the above embodiments, the lubricating oil pressure Pu was acted in the medium speed stage by way of example, it is not essential to employ the lubricating oil pressure Pu and it is a matter of course that another pressure like the lubricating oil pressure can be separately produced and utilized for the same purpose. In this connection, the use of the lubricating oil pressure Pu offers an advantage that the existing valve can be utilized. Moreover, although the lock-up was effected over the continous three transmission gear ratios in the above embodiments by way of example, it is apparent that the present invention is also applicable to the system as previously proposed by the applicant of this invention, in which the lock-up is effected over two transmission gear ratios.

According to the present invention, as fully described hereinabove, since the control means has a variable characteristic with which the vehicle speed starting to actuate the direct-coupling clutch is varied to the lower speed side in accordance with an automatic shift position of the gear shift control means and to the higher speed side in accordance with a manual shift position thereof, it becomes possible to effect the lock-up all over the range, to reduce the practical fuel consumption as well as to prevent deterioration of the power efficiency. Moreover, the control means is simple in its construction and has high reliability, because it is designed to be hydraulically operated.

It is readily apparent that the above-described direct coupling clutch control device meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. In a direct coupling clutch control device for a torque converter in vehicular automatic transmission comprising; a fluid-type torque converter having an output member; an auxiliary transmission coupled to said torque converter and capable of selecting any of a plurality of multi-staged transmission gear ratios; a hydraulic direct-coupling clutch disposed between said input and output members and operable to mechanically couple said members to each other; a gear shift control means adapted to select any one of said transmission gear ratios in an automatic or manual fashion switched as required having an automatic gear shift position and a manual gear shift position; and a control means for controlling operation of said direct-coupling clutch, said direct-coupling control device is characterized in that said control means has such a variable characteristic with which the vehicle speed for starting to actuate said direct-coupling clutch is shifted with oil pressure to the lower speed side in accordance with an automatic gear shift position of said gear shift control means and to the higher speed side in accordance with a manual gear shift position thereof.

2. A direct-coupling control device for a torque converter in vehicular automatic speed transmission according to claim 1, wherein said control means includes means for controlling an engagement force of said direct-coupling clutch and having a means for selecting a larger pressure selected between a pressure which is increased in proportion to the vehicle speed and another pressure independent of the vehicle speed, and means for disconnecting any influence of said another pressure independent of the vehicle speed when said gear shift control means is in said manual gear shift position.

3. A direct-coupling control device for a torque converter in vehicular automatic speed transmission according to claim 1, wherein said control means includes means for controlling an engagement force of said direct-coupling clutch in proportion to a larger pressure selected between a pressure which is increased proportionally to the vehicle speed and lubricating oil pressure which is determined by regulating surplus oil from a hydraulic source through a pressure governing valve, and means for disconnecting any influence of said lubricating oil pressure when said gear shift control means is in said manual gear shift position.

4. A direct-coupling control device for a torque converter in vehicular automatic speed transmission according to claim 2, wherein said control means is so arranged to engage said direct-coupling clutch ranging over both a first transmission gear ratio where said direct-coupling clutch can be engaged and a second transmission gear ratio corresponding to at least one of transmission gear ratios adjacent to said first transmission gear ratio, said control means is provided with a lock-up releasing valve reciprocally movable between a first changeover position and a second changeover position in conjunction with a gear shift between said first and second transmission gear ratios, and said lock-up releasing valve has means for disconnecting any influence of said another pressure independent of the vehicle speed in its first or second changeover position.

* * * * *